United States Patent [19]

Shaw

[11] Patent Number: 4,986,221

[45] Date of Patent: Jan. 22, 1991

[54] LIVESTOCK WATERER AND METHOD

[76] Inventor: Daniel C. Shaw, 520 Old Mins Rd., Geneva, Fla. 32732

[21] Appl. No.: 261,234

[22] Filed: Oct. 21, 1988

[51] Int. Cl.$^5$ .............................................. A01K 7/06
[52] U.S. Cl. ........................................ 119/73; 119/75
[58] Field of Search ...................... 119/72, 73, 75, 158, 119/159, 61, 62; 239/29; 4/623, DIG. 3; 137/561 R, 877, 867; 251/30.01, 30.02, 228

[56] References Cited

U.S. PATENT DOCUMENTS

| | | | |
|---|---|---|---|
| 531,800 | 1/1895 | Kriegstedt | 119/75 |
| 1,227,279 | 5/1917 | Louden | 119/75 |
| 1,249,139 | 12/1917 | Lewis | 119/75 |
| 1,302,939 | 5/1919 | Louden | 119/75 |
| 2,844,124 | 7/1958 | Andera | 119/75 |
| 3,381,667 | 5/1968 | Martin | 119/75 |
| 3,724,001 | 4/1973 | Ichimori et al. | 4/623 |
| 3,734,057 | 5/1973 | Lee et al. | 119/159 X |
| 3,831,558 | 8/1974 | Forbes | 119/73 |
| 4,065,195 | 12/1977 | Fahmie | 119/61 X |
| 4,682,628 | 7/1987 | Hill | 137/624.11 |
| 4,823,414 | 4/1989 | Piersimoni et al. | 4/623 |
| 4,872,485 | 10/1989 | Laverty, Jr. | 4/623 |

FOREIGN PATENT DOCUMENTS 390417 6/1924 Fed. Rep. of Germany ........ 119/75
99911 7/1923 Switzerland ........................ 119/75

OTHER PUBLICATIONS

Ritchie Fountains, How to Use Water to Boost Profits, 1974, pp. 1–24.
Mira Fount, Energy-Free Waterers.
Freeze-Free Automatic Waterer.

Primary Examiner—Gene Mancene
Assistant Examiner—Todd E. Manahan
Attorney, Agent, or Firm—Shlesinger & Myers

[57] ABSTRACT

An animal waterer comprises a bowl having an open top and a bottom drain, and a valve is operatively associated with the drain for selectively blocking and unblocking the drain. A water supply line cooperates with the valve and is operably associated with the bowl for supplying water to the bowl when the valve blocks the drain so that the bowl thereby fills with water and for causing water to drain from the bowl when the valve does not block the drain. A sensing system is operatively associated with the bowl and with the drain for causing the valve to block the drain when the presence of an animal is sensed so that the bowl is thereby filled with water for the animal to drink and for causing the valve to unblock the drain when no animal is sensed so that the bowl is drained of water.

20 Claims, 3 Drawing Sheets

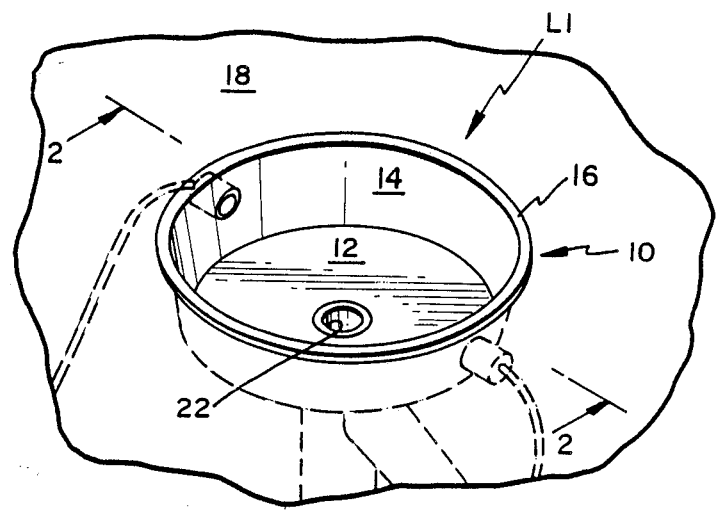
FIG.1
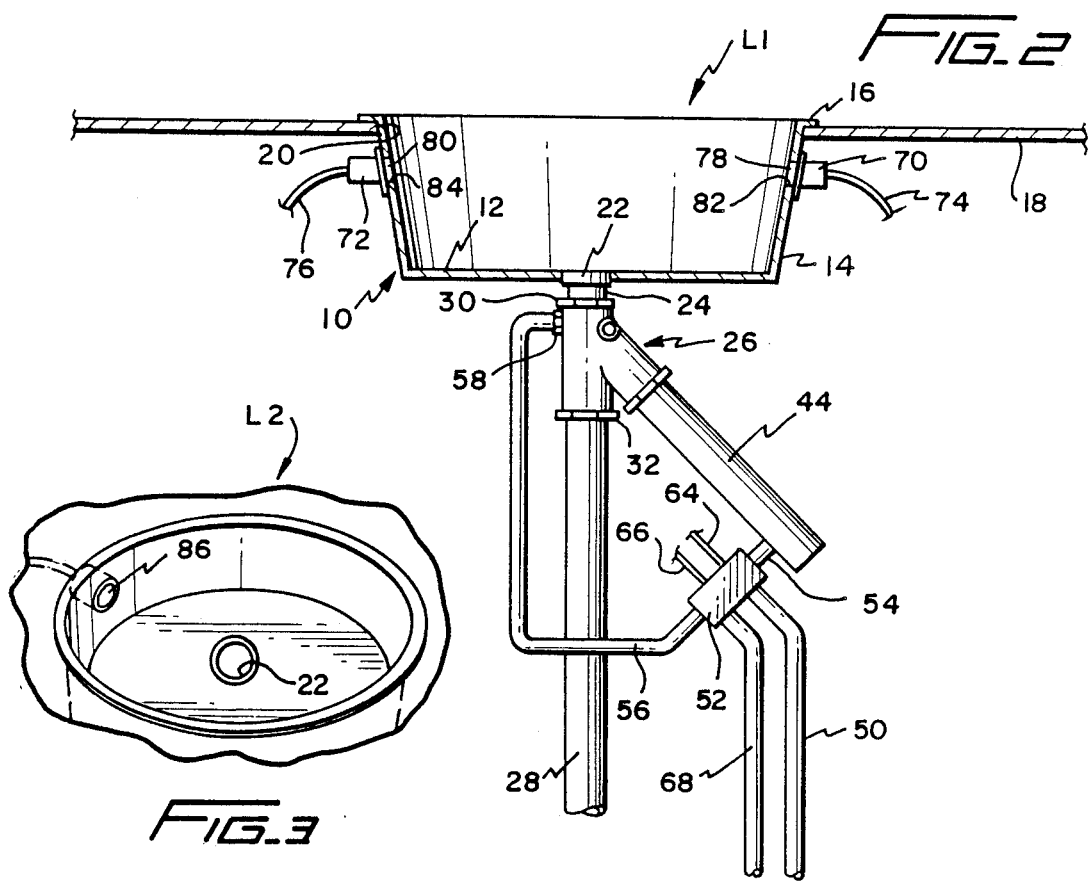
FIG.2
FIG.3

4,986,221

LIVESTOCK WATERER AND METHOD

BACKGROUND OF THE INVENTION

The watering of livestock, such as cows, horses, pigs and the like, is necessary to maintain, promote and stimulate growth. Cows, for example, require water not only to sustain themselVes, but also to produce milk which may then be sold for consumption. The volume of water consumed by a cow, therefore, has an impact on the volume of milk produced and, as a consequence thereof, the cost of milk.

The watering of livestock has, in the past, been accomplished through the use of troughs, buckets and the like. While a trough may be suitable at some times during the year, it is not suitable during freezing conditions which cause ice to form on the surface of the water, thereby preventing the livestock from drinking. Extremely warm conditions, on the other hand, particularly when the trough does not have a continuous water flow, may cause the water to become stagnant or otherwise unsuitable for drinking. FinallY, it is not unusual for some animals to consume feed and to then drink, with the result that animal feed contaminates the water.

The prior art discloses various types of livestock waterers having the purpose of maintaining water flow, supplying water only as desired, and insulating the trough in order to prevent freezing. For the most part, these attempts to proVide a livestock waterer permitting temperature controlled, fresh water to be supplied only as needed have been unsuccessful and unnecessarily complicated. For example, it is frequently required that the animal depress some sort of a lever or the like with its nose.

In view of the above, it can be appreciated that there is a need for a livestock waterer which supplies fresh water for drinking, but only as and when desired by the livestock. Should the livestock not desire a drink, then the waterer should remove the water from the drinking receptacle in order to prevent it from freezing or stagnating. Preferably, the waterer should be activated without requiring physical contact by the livestock, thereby eliminating the need for levers, press bars and the like.

OBJECTS AND SUMMARY OF THE INVENTION

The primary object of the disclosed invention is a livestock waterer which utilizes a non-contact sensor for causing a drinking receptacle to fill with fresh water when the livestock wishes a drink, and which causes the receptacle to be drained at substantially all other times.

Yet a further object of the invention is a method by which non-contact means sense the presence of an animal wishing a drink in order to cause a receptacle to fill, and the lack of such presence is utilized for causing the receptacle to drain.

An animal waterer pursuant to the invention comprises a bowl having an open top and a bottom drain. Valve means are operativelY associated with the drain for selectively unblocking and blocking the drain. Water supply means cooperate with the bowl and are operatively associated with the valve means for supplying water to the bowl when the valve mean blocks the drain so that the bowl thereby fills with water, and for causing water to drain from the bowl when the valve means does not block the drain. Sensing means are oper-. atively associated with the bowl and. with the drain means for causing the valve means to block the drain when the presence of an animal is sensed so that the bowl is thereby filled with water for the animal to drink, and for causing the valve means to unblock the drain when no animal is sensed so that the bowl is thereby drained of water and contaminants therein.

A livestock waterer comprises a bowl including an open top and a bottom drain. Check valve means are in flow communication with the drain for blocking and unblocking the drain, and means are operably associated with the check valve means for causing selective operation thereof. A water supply line communicates with the bowl for supplying water thereto and a water supply means is proVided. Valve means are operably associated with the water supply means the water supply line and the causing means for selectively supplying water to the water supply line and the causing means so that the check valve means blocks the drain while water flows into the bowl through the water supply line, and for preventing water from flowing to the causing means and the water supply line so that the check valve means unblocks the drain and thereby permits water to drain from the bowl. A non-contact radiant energy sensing means is operably associated with the bowl and with the check valve means for causing the valve means to supply water to the water supply line and the causing means when the presence of an animal is sensed, and for causing the valve means to prevent water from being supplied to the water supply line and the causing means when no animal is sensed.

The method of watering livestock according to the invention comprises the steps of providing a livestock waterer comprising a bowl having an open top and a bottom drain, valve means are operably associated with the drain for selectively blocking and unblocking the drain, and water supply means cooperate with the valve means and the bowl for supplying water to the bowl when the valve means blocks the drain so that water thereby fills the bowl and livestock may drink therefrom, and for causing water to drain from the bowl when the valve means does not block the drain. The presence of livestock is detected with non-contact sensing means for causing the water supply means to supply water to the bowl and the valve means to block the bowl when livestock are sensed and for causing the bowl to drain when no livestock are detected.

These and other objects and advantages of the invention will be readilY apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a fragmentary perspective view with portions shown in phantom of a livestock waterer pursuant to the invention;

FIG. 2 is a cross-sectional view thereof taken along the line 2—2;

FIG. 3 is a fragmentary perspective view with portions shown in phantom of a second embodiment of the invention;

DESCRIPTION OF THE INVENTION

Figure 4:
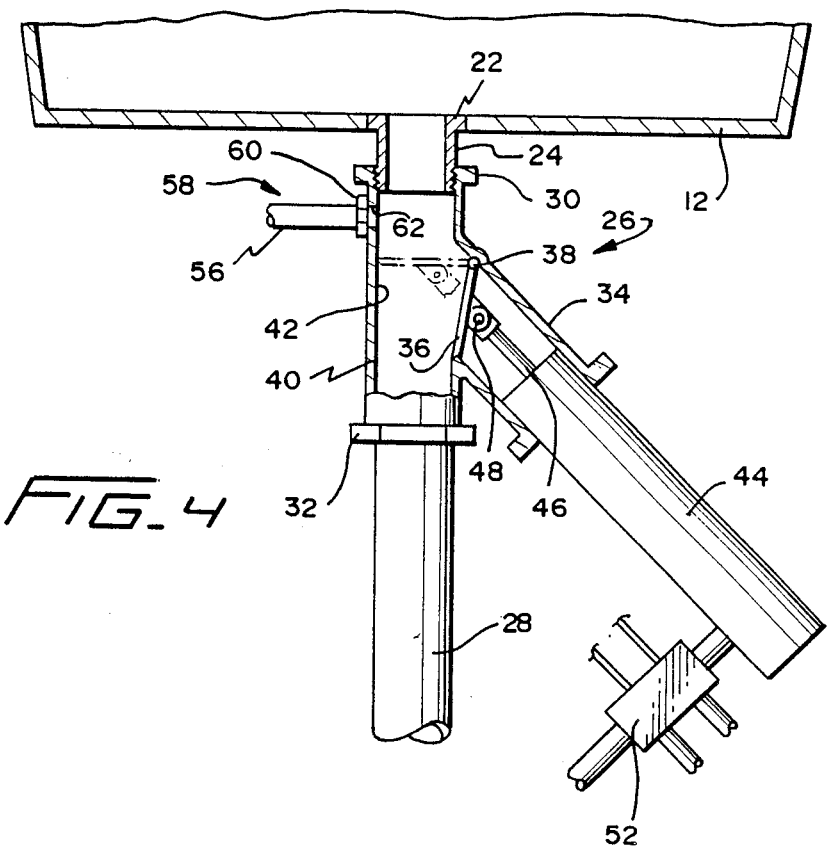
FIG. 4 is a fragmentary elevational view with portions shown in section of the waterer of FIG. 1.

Livestock waterer L1, as best shown in FIGS. 1 and 2, includes a bowl 10 having a bottom 12, upstanding continuous wall 14 and upper peripheral flange 16. The flange 16 and the wall 14 provide the bowl 10 with an open top. The flange 16, preferably, rests upon floor 18, so that the wall 14 is positioned within opening 20. In this way, the bowl 10 and the remaining portions of the waterer L1 are disposed below the floor 18 in order to prevent them from being damaged, frozen or otherwise rendered inoperable.

Drain 22 is positioned in bottom 12, preferably at the center thereof, and has a nipple 24 in flow communication with check valve 26. Drain line 28 is in flow communication with check valve 26. It can be appreciated from FIG. 4 that the pipe nipple 24 is threadedly connected to first end portion 30 of check valve 26, while drain line 28 is threadedly connected to oppositely disposed second end portion 32. The drain line 28 leads to some sort of waste disposal facility, such as provided by a sewer or the like.

Check valve 26 has an extension 34 extending downwardly at an angle to the axis extending between the end portions 30 and 32. Swinging gate 36 is pivotal about shaft 38 between a first position, as illustrated in solid line in FIG. 4, wherein the gate 36 permits water to flow through valve body 40, and a blocking position, illustrated in phantom in FIG. 4, wherein the gate 36 blocks the opening 42 in valve body 40 and thereby prevents water from draining through check valve 26. The result is, therefore, that when the gate 36 is in the blocking position of FIG. 4, then the water contained within bowl 10 is retained there, in order to permit the animal to drink.

Cylinder 44 is secured to valve extension 34 and extends therefrom. Piston 46 of cylinder 44 is pivotally secured to gate 36 through pivot shaft 48. In this way extension and retraction of piston 46 causes the gate 36 to move between the blocking and unblocking positions.

Water supply line 50, as best shown in FIG. 2, communicates with cylinder 44 through solenoid operated valve assembly 52 and water line 54. Water line 56 extends from solenoid operated valve 52 to inlet 58 of valve body 40. The inlet 58, as best shown in FIG. 4, includes a nut 60 which secures the water line 56 in flow communication with opening 62 of valve body 40. It is to be noted in FIG. 4 that the inlet 58 is disposed above the gate 36 when the gate 36 is in the blocking position.

Control leads 64 and 66 are in electrical communication with solenoid operated valve 52 in order to cause the valve 52 to shift between a first position wherein water from supply line 50 is directed to the cylinder 44 and the water line 56, and a second position wherein the water in the cylinder 44 and in the water line 56 is caused to drain through water drain line 68. The water drain line 68 permits water in the cylinder 44 and/or water line 56 to be drained therefrom in order to minimize the risk of freezing. Shifting of the valve 52 to the second position causes the piston 46 to retract as the water in cylinder 44 drains.

Livestock waterer L1 has an infrared sensing system provided by infrared emitter 70 and infrared detector 72, as best shown in FIG. 2. The emitter 70 is mounted to wall 14 intermediate bottom 12 and flange 16, and the detector 72 is aligned therewith on an opposite side of the bowl 10. In this way, the emitter 70 continuously transmits an infrared beam in the direction of detector 72. Should an animal desirous of a drink block this beam, then its presence will be sensed. Naturally, the emitter 70 has lead 74 and detector 72 has lead 76 which communicate with the leads 64 and 66, respectively, of the solenoid valve 52 through appropriate control circuitry. Preferably, lenses 78 and 80 are mounted in apertures 82 and 84, respectively, of bowl 10 in order to facilitate transmission and reception of the infrared beam.

OPERATION

Operation of the livestock waterer L1 is essentially automatic on account of the non-contact sensing provided by emitter 70 and detector 72. As long as no animal blocks reception of the infrared beam by the detector 72, then the solenoid operated valve 52 is set such that water flow from supply line 50 is prevented, and drainage from cylinder 44 and water line 56 is permitted. In that event, then the gate 36 assumes the unblocked position, illustrated in solid line in FIG. 4, with the result that the bowl 10 is drained.

Should an animal wish a drink, then the animal need merely lower its head into the bowl 10, until such time as the infrared beam emitted by the emitter 70 is prevented from reaching the detector 72. At that point, the control circuitry causes the solenoid operated valve 52 to shift in order to direct water from line 50 to cylinder 44 and water line 56. When this shift occurs, then the piston 46 extends, and thereby causes the gate 38 to assume the position wherein the opening 42 of the valve body 40 is blocked. At the same time, because the inlet 58 is above the gate 36, then the water issuing from water line 56 fills the bowl 10, thereby permitting the animal to drink.

For so long as the animal prevents the infrared beam from reaching the detector 72, then the solenoid operated valve 52 will continue to cause water to flow through the line 56 to the bowl 10. Furthermore, I have found that it is not unusual for animals to be temporarily satiated, and to remove their head from the bowl 10 for a brief period. For that reason, I prefer that the solenoid operated valve 52 continue to direct water to the cylinder 44 and the water line 56 for a period of several seconds after the infrared beam once again impinges upon the detector 72. This delay period prevents excessive cycling of the valve 52. Should the infrared beam impinge upon the detector 72 for more than a selected time, such as five seconds or the like, then the control circuitry will again cause the solenoid operated valve 52 to shift in order to drain water from the cylinder 44 and the water line 56.

PASSIVE DETECTION

FIG. 3 discloses a second embodiment of the invention wherein the infrared detection system is provided by a passive detector, rather than an active detector system as illustrated for waterer L1. An active detector system, such as provided by the emitter 70 and the detector 72, requires that a beam be sent to a detector for detection to occur. The detector may be integral with the emitter, such that reflected radiation is received. In any event, a passive detector does not require the presence of an additional infrared emitter and relies upon the radiant energy generated by animate bodies. The passive detector has a sensor which, upon change in the intensity of the infrared radiation of a selected portion of the spectrum, induces a voltage change therein. This voltage change permits the presence of an animate body to be detected.

Preferably, the passive detector is a pyroelectric element comprising a pyroelectric substrate, such as polarized ceramic or polyvinyldene fluoride. The substrate has the property that, when the infrared radiation impinges thereon, its spontaneous polarization is caused to change and an electrical charge corresponding to the degree of this change is formed at either end of the pyroelectric substrate. The result is that the voltage across the pyroelectric substrate is proportional to the rate of change of the incident infrared light.

An exemplary passive detector is sold by Eltec Instruments Inc. under the trademark IR-EYE Integrated Sensor, Model 442. This sensor has a lithium tantalate pyroelectric substrate. The sensor is particularly adapted for monitoring the spectrum throughout the range of 7.5 to 12.0 $\mu$m. This portion of the spectrum is known to be of the range wherein animate bodies, such as people, animals and the like, emit infrared radiation. Monitoring of this portion of the spectrum permits the sensor system to differentiate between animate objects, and inanimate objects which are likewise emitting radiation but within a different range of the spectrum. The result is that a rock or the like placed in the bowl 10, will not be sensed by the detector 86.

The remaining elements of the livestock waterer L2 of FIG. 3 are substantially the same as those of the waterer L1, and it is believed that no further discussion thereof is necessary.

COLUMN MOUNTED EMBODIMENT

Figure 5:
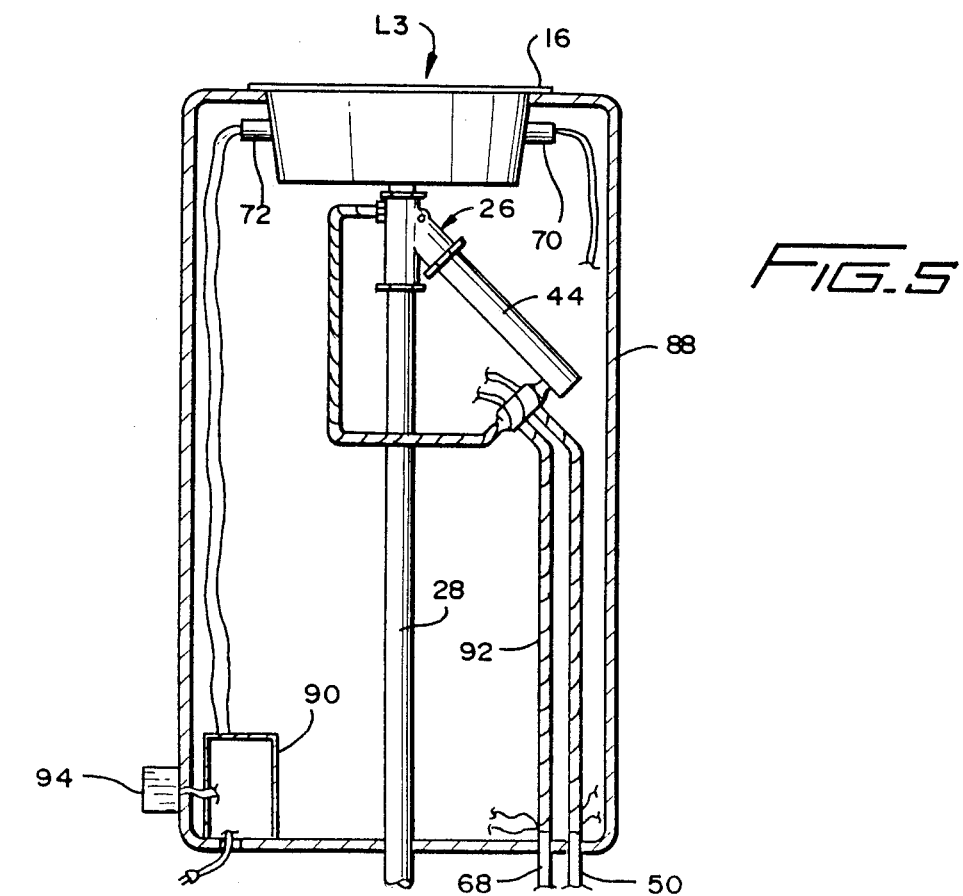
FIG. 5 is an elevational view partially in section of a third embodiment of the invention; and, FIG. 6 is a schematic diagram of a control circuit for operating the invention.

FIG. 5 discloses a third embodiment L3 of the livestock waterer of the invention wherein the bowl 10 is mounted within column 88. The column 88 is, preferably, comprised of stainless steel, plastic, concrete or the like and has an upper support surface for receiving the flange 16 of the bowl 10. The result is that an animal, such as a horse, need not lower its head to the floor in order to drink. Furthermore, because the column 88 is comprised of materials having substantial sound absorbing capabilities, then any noise attributable to operation of the check valve 26 and/or the solenoid operated valve 52 is absorbed. This is a particularly desirable feature for horses, because they tend to become startled by sudden noises.

It can be noted in FIG. 5 that the check valve 26, cylinder 44 and drain line 28 are all mounted within the column 88. Likewise are the other components, such as the supply line 50 and the water drain line 68. This has the desirable effect of minimizing temperature fluctuations, particularly in cold climates. Also to be noted as being mounted within column 88 is control box 90 which houses the control circuitry.

Although the column 88 is comprised of material not only having sound absorbing capabilities, but also substantial thermal insulating capabilities, I have found it desirable to provide additional heating in order to prevent freezing of whatever water may be contained within water line 56, supply line 50 and water drain line 68. In this regard, heat tape 92, which, preferably, comprises electric resistance heating elements disposed in a tape-like form having an outer insulated cover, is wrapped about supply line 50, water drain line 68, water line 56 and solenoid operated valve 52. The heat tape 92 may be wired to a manually operable switch or, preferably, as illustrated in FIG. 5, is controlled by a thermostat 94. This assures that the heat tape 92 is activated only when the temperature is sufficiently below freezing.

Although I have illustrated the waterer L3 as utilizing an active non-contact infrared sensing system, those skilled in the art will understand that the passive detector 86 of the waterer L2 of FIG. 3 could also be utilized. What is important is that the sensor system be positioned within the bowl 10 in order to be certain that the animal wishes to drink, and is not merely passing by. Also, I have found that animals, particularly cows, quickly learn how to operate the sensor system, and there is little difficulty in having them use the waterers.

CONTROL CIRCUITRY

Figure 6:
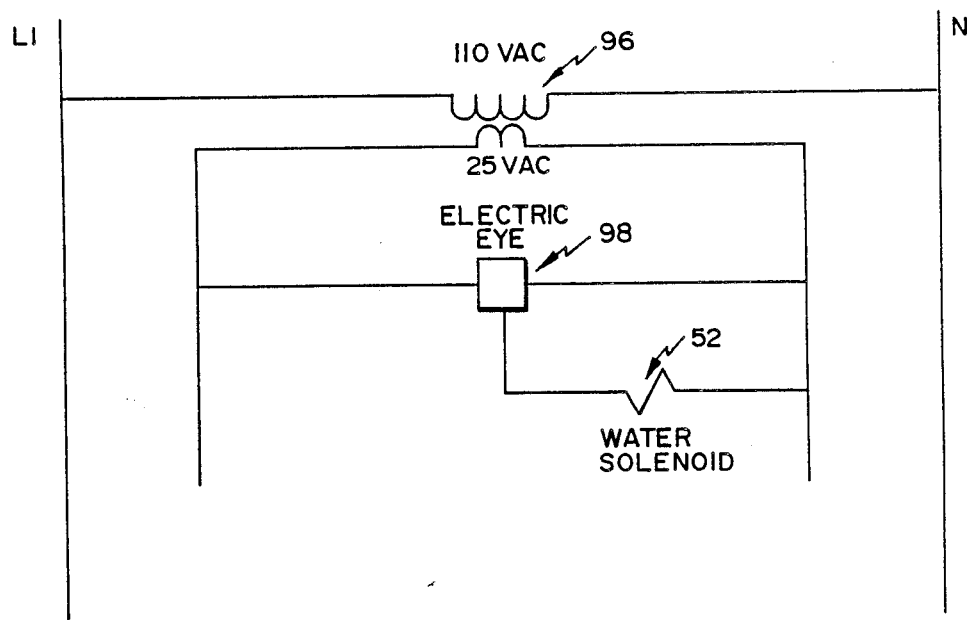

FIG. 6 is a schematic view illustrating the control circuitry which I utilize in causing operation of the solenoid operated valve 52 in response to the noncontact infrared sensor system. In this regard, I prefer that a transformer 96 step down the line voltage from the normal household 110 VAC to 25 VAC. The sensor system 98 is operated at the 25 VAC level, and the sensor system 98 is meant to include the passive sensor 86 or the active sensors 70 and 72. The sensor system 98 causes operation of the solenoid operated valve 52, with the result that detection of an animal by the sensor system 98 causes responsive shifting of the solenoid operated valve 52 as a means for supplying or draining water from the bowl 10.

While this invention has been described as having a preferred design, it is understood that it is capable of further modifications, uses and/or adaptations of the invention following in general the principle of the invention and including such departures from the present disclosure as come within known or customary practice in the art to which the invention pertains as may be applied to the central features hereinbefore set forth, and fall within the scope of the invention of the limits of the appended claims.

What I claim is:

1. An animal waterer, comprising:
   (a) a bowl having an open top and a bottom drain;
   (b) first valve means operatively associated with said drain for selectively blocking and unblocking said drain;
   (c) water supply means cooperating with said bowl and operatively associated with said first valve means for supplying water to said bowl when said first valve means blocks said drain so that said bowl thereby fills with water, and for preventing water from flowing to said bowl when said first valve means does not block said drain;
   (d) second valve means interposed between said first valve means and said water supply means and operably associated with said first valve means; and
   (e) non-contact sensing means operatively associated with said bowl, said water supply means and said first and second valve means for causing said first valve means to block said drain when the presence of an animal is sensed so that said bowl is thereby filled with water for the animal to drink, and for causing said first valve means to unblock said drain and said second valve means to block said water supply means to prevent water from flowing to said bowl when no animal is sensed so that said bowl is drained of water; said second valve means being operably associated with said sensing means for causing water to flow to said first valve means when the presence of an animal is sensed, and for permitting water to drain from said first valve means and from said bowl when no animal is sensed.

2. The waterer of claim 1, wherein:
(a) said sensing means is a radiant energy sensor system.

3. The waterer of claim 2, wherein:
(a) said sensor system operates in the infrared range of the spectrum.

4. The waterer of claim 3, wherein:
(a) said sensor system includes a passive sensor.

5. The waterer of claim 2, wherein: (a) said sensor system comprises a pair of aligned infrared sense assemblies, one of the assemblies is an infrared emitter and the other assembly is an infrared detector.

6. The waterer of claim 1, wherein:
(a) said first valve means is a fluid operated valve assembly.

7. The waterer of claim 6, wherein:
(a) said valve assembly comprises a check valve.

8. The waterer of claim 7, wherein:
(a) said check valve includes a swinging gage for blocking said drain when in a first position and for unblocking said drain when in a second position; and,
(b) said valve assembly further comprises a cylinder and piston assembly having the cylinder thereof in flow communication with said second valve means and with the piston thereof operably engaged with said gate so that supplying water to said cylinder causes said piston to be extended for thereby displacing said gate to said first position and draining of water from said cylinder causes said piston to retract for thereby displacing said gate to said second position.

9. The waterer of claim 8, wherein:
(a) said valve assembly includes an elongated valve body having a central aperture extending between opposite ends thereof and with one of the ends connected to said drain and the other of the ends in communication with a second drain, and with said gate positioned within said body intermediate said ends; and,
(b) said water supply means has an outlet in said valve body disposed above said gate and in flow communication with said central aperture so that said bowl is supplied with water through said bottom drain.

10. The waterer of claim 9, wherein:
(a) heating means are disposed about said water supply means and said second valve means for preventing freezing of water contained therein.

11. The waterer of claim 2, wherein:
(a) said sensor system is mounted intermediate said open top and said bottom drain.

12. The waterer of claim 1, further comprising:
(a) an upright, elongated stand having a centrally extending aperture and an upper peripheral flange;
(b) said bowl having a flange around said open top; and,
(c) said bowl seated in said stand opening so that said bowl flange engages and is supported by said stand flange and said valve and water supply means are thereby disposed within said stand.

13. A livestock waterer, comprising:
(a) a bowl including an open top and a bottom drain;
(b) check valve means in flow communication with said drain for blocking and unblocking said drain;
(c) means operably associated with said check valve means for causing selective operation of said check valve means;
(d) a water supply line communicating with said bowl for supplying water thereto;
(e) water supply means;
(f) second valve means operably associated with said water supply means, said water supply line and said causing means for selectively supplying water to said water supply line and said causing means so that said check valve means blocks said drain while water flows into said bowl through said water supply line and for preventing water from flowing to said causing means and said water supply line so that said check valve means unblocks said drain and thereby permits water to flow therefrom; and,
(g) non-contact radiant energy sensing means operably associated with said bowl and with said second valve means for causing said second valve means to supply water to said water supply line and said causing means when the presence of an animal is sensed and for causing said second valve means to prevent water from being supplied to said water supply line and causing means when no animal is sensed.

14. The waterer of claim 13, wherein:
(a) said sensing means comprises a first sensor having a sensing portion thereof positioned within said bowl intermediate said open top and said bottom drain.

15. The waterer of claim 14, wherein:
(a) said sensing means is a passive detector and said first sensor comprises means for monitoring a selected portion of the infrared region of the spectrum.

16. The waterer of claim 13, wherein:
(a) said sensing means comprises a pair of aligned sensors, each sensor having a sense portion disposed within said bowl intermediate said open top and bottom drain and one of the sensors is an infrared emitter and the other of the sensors is an infrared detector.

17. The waterer of claim 13, wherein:
(a) said check valve means is a swinging gate valve having a gate pivotal between block and unblock positions; and,
(b) said causing means includes a cylinder and piston assembly having the piston thereof operably connected with said gate for causing pivoting thereof and the cylinder thereof is in flow communication with said valve means so that supply of water to said cylinder causes extension of said piston and thereby pivoting of said gate to said block position and cessation of water supply causes retraction of said piston and thereby pivoting of said gate to said unblock position.

18. The waterer of claim 17, wherein:
(a) said swinging gate valve has an elongated body with a central aperture extending between opposite ends thereof and with said gate positioned within said body intermediate said ends, one of the ends is in flow communication with said bottom drain and the other of said ends is in flow communication with a second drain; and, (b) said water supply line has an outlet in said body communicating with said aperture and disposed above said gate so that water is supplied to said bowl through said bottom drain.

19. The waterer of claim 18, further comprising:
(a) an elongated, upright stand having a central aperture;
(b) said bowl received in said stand so that said open top is flush with a top portion of said stand; and,
(c) said check valve means, causing means, water supply means and line, and second valve means are positioned within said stand.

20. The waterer of claim 19, wherein:
(a) heat means are wrapped about said water supply line and water supply means and said second valve means for preventing freezing thereof.

* * * * *